United States Patent [19]
Chronowski et al.

[11] Patent Number: 5,823,122
[45] Date of Patent: Oct. 20, 1998

[54] SYSTEM AND PROCESS FOR PRODUCTION OF FUEL GAS FROM SOLID BIOMASS FUEL AND FOR COMBUSTION OF SUCH FUEL GAS

[75] Inventors: Robert A. Chronowski, Great Falls; William L. Woerner, Ebony, both of Va.

[73] Assignee: Alternative Energy Development, Inc., Silver Spring, Md.

[21] Appl. No.: 315,450

[22] Filed: Sep. 30, 1994

[51] Int. Cl.$^6$ .................................................. F23G 15/00
[52] U.S. Cl. .......................... 110/346; 110/348; 110/229; 110/234
[58] Field of Search ................................... 110/213, 210, 110/229, 234, 248, 348, 347, 346

[56] References Cited

U.S. PATENT DOCUMENTS

| | | | |
|---|---|---|---|
| 3,808,986 | 5/1974 | Logdon | 110/8 R |
| 4,312,278 | 1/1982 | Smith et al. | 110/234 |
| 4,334,484 | 6/1982 | Payne et al. | 110/210 |
| 4,356,778 | 11/1982 | McRee, Jr. | 110/234 X |
| 4,378,208 | 3/1983 | Payne et al. | 432/14 |
| 4,395,956 | 8/1983 | Hand, Jr. et al. | 110/235 |
| 4,428,308 | 1/1984 | Birchfield et al. | 110/229 |
| 4,465,022 | 8/1984 | Virr | 122/4 D |
| 4,483,256 | 11/1984 | Brashear | 110/210 |
| 4,531,462 | 7/1985 | Payne | 110/210 |
| 4,565,137 | 1/1986 | Wright | 110/234 X |
| 4,586,442 | 5/1986 | Caughey | 110/229 |
| 4,687,436 | 8/1987 | Shigeta | 110/264 X |
| 4,747,355 | 5/1988 | van Berkum | 110/229 |

(List continued on next page.)

OTHER PUBLICATIONS

Excerpts from "Shuqualak Lumber Company Integrated Gasification–Combustion System Performance Trials", Alternative Energy Development, Inc. (Jul. 27, 1992).

"Biomass Gasifier & Combustion Chamber, W/Heat Recovery System", Drawing No. 5001B9, Hurst Boiler & Welding Co., Inc. (Apr. 21, 1992).

*Primary Examiner*—Henry A. Bennett
*Assistant Examiner*—Susanne C . Tinker
*Attorney, Agent, or Firm*—Roylance, Abrams, Berdo, & Goodman, L.L.P.

[57] ABSTRACT

A system for the production of fuel gas from solid biomass fuels and for the combustion of said fuel gas is disclosed which comprises a gasification zone for producing a fuel gas from a solid biomass fuel, said gasification zone being adapted for connection to a solid biomass fuel supply and to a gasification air supply, a predetermined ignition point, a pathway for conveying fuel gas from the gasification zone to the ignition point, and a combustion air injection device for mixing fuel gas and combustion air at the ignition point to initiate combustion of the fuel gas and the combustion air, and for shaping and directing the flame produced, said device being adapted for connection to a combustion air supply. A process for retrofitting a heat transfer device, such as a steam or hot water boiler, a thermal liquid heater, or a kiln, which has a combustion zone and a heat transfer area adjacent to the combustion zone, is also disclosed which comprises providing a gasification zone for producing fuel gas from solid biomass fuel, connecting a solid biomass fuel supply and a gasification air supply to the gasification zone, providing a pathway between the gasification zone and the combustion zone, providing a predetermined ignition point in the pathway, providing a combustion air injection device in the pathway for mixing fuel gas and combustion air at the ignition point to initiate combustion of the fuel gas and the combustion air and for shaping and directing the flame produced into the combustion zone toward the heat transfer area, and connecting a combustion air supply to the combustion air injection device.

30 Claims, 4 Drawing Sheets

U.S. PATENT DOCUMENTS

| | | | |
|---|---|---|---|
| 4,828,581 | 5/1989 | Feldman et al. | 48/197 R |
| 4,848,249 | 7/1989 | LePori et al. | 112/234 |
| 4,870,910 | 10/1989 | Wright et al. | 110/190 |
| 4,930,429 | 6/1990 | Ryham | 110/229 |
| 4,941,415 | 7/1990 | Pope et al. | 110/235 |
| 4,971,599 | 11/1990 | Cordell et al. | 48/76 |
| 5,026,403 | 6/1991 | Michel-Kim | 48/203 |
| 5,089,030 | 2/1992 | Michel-Kim | 48/76 |
| 5,138,957 | 8/1992 | Morey et al. | 110/234 |
| 5,178,076 | 1/1993 | Hand et al. | 110/210 |
| 5,216,967 | 6/1993 | Mormino | 110/235 |
| 5,279,234 | 1/1994 | Bender et el. | 110/210 |
| 5,388,534 | 2/1995 | Doron et al. | 110/234 X |

SYSTEM AND PROCESS FOR PRODUCTION OF FUEL GAS FROM SOLID BIOMASS FUEL AND FOR COMBUSTION OF SUCH FUEL GAS

BACKGROUND OF THE INVENTION

1. Field of the Invention

This invention relates generally to a process and system for the production of fuel gas from solid biomass fuel and for the combustion of such fuel gas for improving the thermal efficiency and optimizing the radiant heat transfer of heat transfer devices which utilize solid biomass fuels. The invention also relates to a process and system for reducing CO, $NO_x$ and $SO_x$ emissions and the amount of particulate carryover with the combustible gases.

2. Description of the Prior Art

In relatively small unit sizes of steam and/or hot water boilers, thermal liquid heaters, and kilns of up to approximately 85 million BTU per hour energy output that are used primarily for industrial and commercial applications, historic practice has been to burn solid biomass fuels on a pile of some type, or in suspension. This has been done with and without a metal grate that is used to both distribute combustion air relatively evenly through the pile of fuel (fuel bed) or to keep the burning fuel in suspension, and to provide a support mechanism for the fuel bed plus the ash produced from combustion of the fuel. Such systems are designed to ignite the solid biomass fuel on or above the grate, and to allow the flame to extend somewhat above the grate to burn out most of the combustible elements of the fuel. The space above and beyond the grate is also normally designed to provide a particulate drop-out space for relatively large entrained fuel and/or ash particles. The combined ignition and burn out space together are called the furnace or combustion chamber, and for solid fuels a substantial volume is included to allow sufficient time for the entire combustion process to be completed. Such an approach means that the distance from the main body of the radiant flame produced through combustion to the metal heat transfer surfaces of the boiler is normally greater than would be needed for optimum radiant heat transfer.

For example, in fire-tube type boilers designed for oil and/or gas firing, the radiant and convection heat transfer processes are each responsible for about 50% (range of 40% to 60%) of the total heat transferred to the steam and/or water through the metal surfaces of the boiler. In the traditional grate type of solid fuel boiler, even employing fire-tubes, the percentages show a different trend with much more for convection heat transfer, and much less for radiation heat transfer. Certain attempts have been made to deal with and rectify this sub-optimum condition, such as staging the combustion, but without a true gasification first step i.e., simply by using secondary and sometimes tertiary air injection, or by employing fluidized-beds (bubbling or entrained). This was done, however, for emissions control, especially for the reduction of $NO_x$ or $SO_x$, and there was no clear-cut gas producer stage employed in an integrated way to control flame propagation and direct the flame produced in a specific way.

SUMMARY OF THE INVENTION

In accordance with the present invention, a system for the production of fuel gas from solid biomass fuels and for the combustion of such fuel gas is disclosed which comprises a gasification zone for producing a fuel gas from a solid biomass fuel, wherein the gasification zone is adapted for connection to a solid biomass fuel supply and to a gasification air supply, a predetermined ignition point, a pathway for conveying fuel gas from the gasification zone to the ignition point, and a combustion injection device for mixing fuel gas and combustion air at the ignition point to initiate combustion of the fuel gas and the combustion air and for shaping and directing the flame produced, wherein the combustion air injection device is adapted for connection to a combustion air supply. The gasification air supply may be preheated. The combustion air supply may also be preheated. In one embodiment, the combustion air injection device comprises a plurality of tuyeres. The tuyeres can inject combustion air at one or more predetermined angles. Preferably, the tuyeres cause the air to exit in a swirling pattern, and the tuyeres are disposed relative to each other such that the swirling air pattern which exits from one tuyere overlaps the swirling air pattern from any adjacent tuyere. Preferably, the gasification zone is a gasification chamber, and preferably, the gasification chamber is a separate stand-alone unit.

The present invention further includes a process for the production of fuel gas from solid biomass fuels and for the combustion of such fuel gas. The process comprises gasifying the solid biomass fuel in a gasification zone to produce a fuel gas, conveying the fuel gas from the gasification zone to a predetermined ignition point, mixing the fuel gas with combustion air at the ignition point, igniting the mixture of fuel gas and combustion air to produce a flame, and shaping and directing the flame produced. The present process improves the radiant heat transfer process in steam or hot water boilers, and thermal liquid heaters which use solid biomass fuels. The present process also reduces the emissions of carbon monoxide, nitrogen oxides, sulfur oxides and particulates entrained in the combustion gases.

The system and process of the present invention are particularly suitable for retrofitting steam or hot water boilers, thermal liquid heaters and kilns which use solid biomass fuels, to improve their thermal efficiency.

DETAILED DESCRIPTION OF THE PREFERRED EMBODIMENTS

Figure 1:
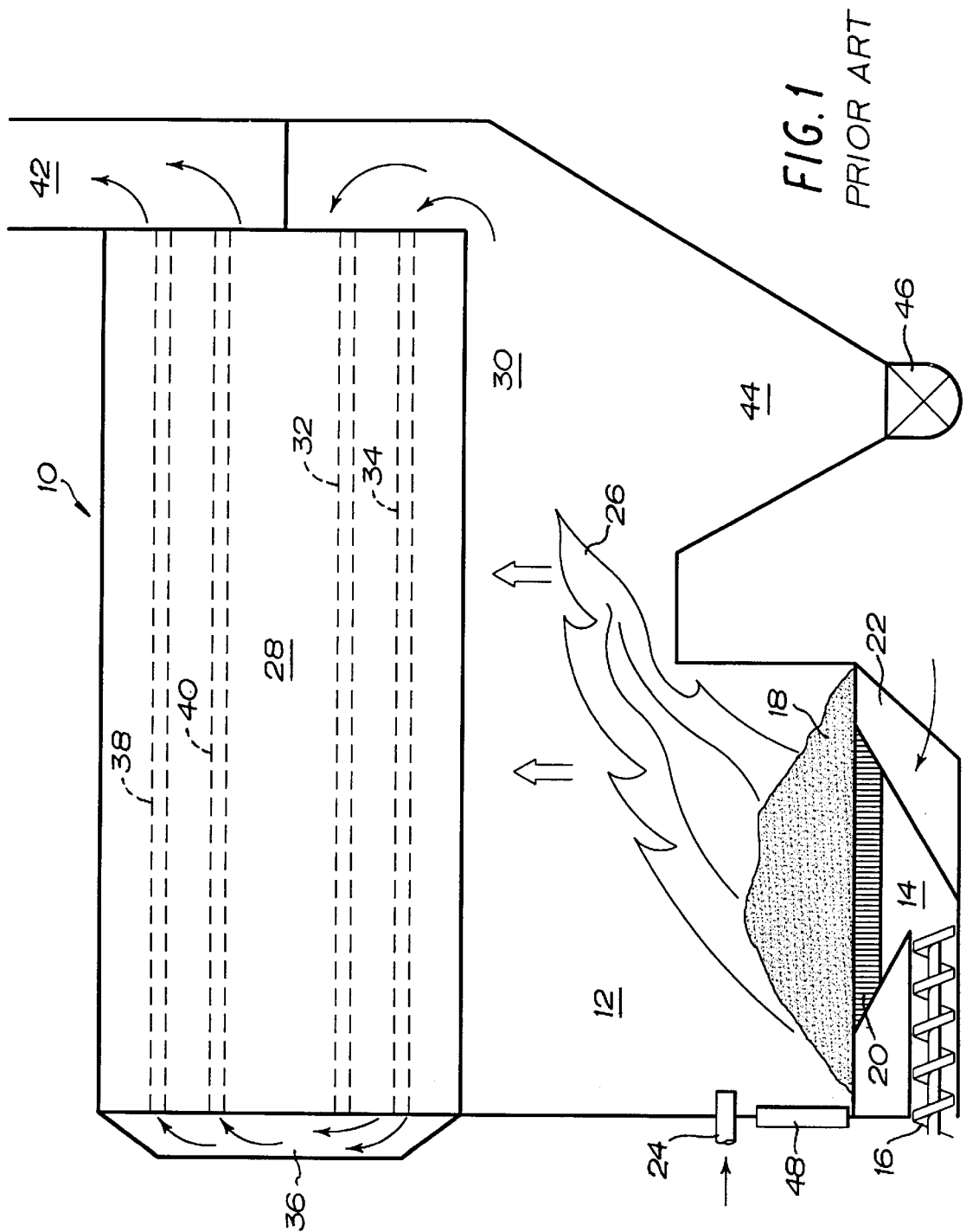
FIG. 1 is a side elevational view of a conventional prior art solid biomass fuel system for a steam boiler.

Using conventional process of combustion of solid biomass fuels, a much larger heat transfer surface must be provided in order to absorb a certain amount of heat through convection than would be required for radiant heat transfer of the same amount of heat. In accordance with the present invention, that heat transfer surface can be reduced by controlling the generation of a flame and its distance from such surface.

The total amount of containment and heat transfer metal required and, hence, cost per unit of boiler output is greater when there is a heavier reliance on convection, than when the radiation heat transfer is increased to the optimum point (between 40% and 60% of the total heat transfer) as is possible with solid biomass fuels with the present invention. The U.S. Boiler Industry standard for oil/gas fired, scotch marine type, fire-tube boilers is 5 square feet of heat transfer surface for every 34.5 pounds per hour of steam produced per boiler horsepower. Solid fuel-fired fire-tube boilers have a normal range of between 7 and 10 square feet per boiler horsepower. The same comparison also applies to water-tube boilers where furnaces for oil/gas units can be almost totally water cooled, while those used for solid fuels have much less exposed heat transfer per unit of furnace volume, plus have greater furnace volumes per unit of boiler rating, and have more total heat transfer surface than do oil/gas units of the same steam output.

The combustion system and process of the present invention permit (1) the retrofit of existing solid biomass fuel steam/hot water boilers, thermal liquid heaters, and kilns that are based on the traditional direct combustion approach, while increasing the efficiency and thermal output rating and reducing particulate and other gaseous emissions, (2) the retrofit of oil/gas boilers, thermal liquid heaters, and kilns to now utilize solid biomass fuels without derating, and (3) the design of new solid biomass fuel capable boilers and thermal liquid heaters producing rated steam/hot water outputs with solid biomass fuels even when oil/gas heat transfer standards are used to rate the boiler output or rate the heat transfer surface per unit of output. Furthermore, the system and process of the present invention will result in efficiencies with solid fuels that were formerly only achieved with the use of oil/gas fuels. The present invention can be used with both fire-tube and water-tube arrangements, and are especially applicable, but not exclusively, to the Horizontal Return Tube (HRT) fire-tube type steam and hot water boilers.

The system and process of the present invention produce an oil/gas-like flame because of the heavy hydrocarbons/tars present along with the normal gasification component gases such as carbon monoxide, hydrogen, and methane, and direct such flame closer to the appropriate heat transfer surfaces than conventional solid biomass fuel combustion approaches can achieve. Because the radiant heat transfer potential is inversely proportional to the square of the distance from the heat transfer surfaces to the flame, moving the flame closer to the surfaces will increase the radiant transfer significantly. This is achieved by using a true gasification process as the first step, then mixing in the desired pattern the hot fuel gases (typically CO, $H_2$ and other vapor state hydrocarbons) with ambient temperature or preheated combustion air, spontaneously igniting the mixture and directing it at a specific angle or flow path/pattern with regard to the heat transfer surfaces, depending on the geometry of the hardware surfaces receiving the heat from the flame. The combustion process can be enhanced to meet the specific hardware arrangement with staging, i.e. secondary and even tertiary combustion air addition points.

In an attempt to improve the performance of solid biomass fuel direct combustion systems of the grate type, cyclonic suspension type, and tangential suspension type, direct combustion units evolved that did improve performance somewhat, but did not achieve the optimum heat transfer performance for solid fuels. The present system and process yield an optimum condition, because the minimum amount of heat transfer surface is needed per thermal unit of output, and the thermal efficiency is maximized. This produces tangible operational, environmental, and return on investment benefits.

Referring now to the drawings, wherein like reference numerals refer to like elements, FIG. 1 depicts a conventional solid biomass fuel system for a steam boiler designated generally by the numeral 10. Steam boiler 10 includes a combustion chamber or furnace 12. Fuel 14 is fed into the system by an underfeed or other fuel feed system 16 to form a fuel pile 18 on top of air distribution grate 20. The primary air supply is introduced through plenum 22. Ignition of the fuel occurs essentially immediately upon its entry into the furnace 12. Secondary combustion air is added through inlet 24 very close to the top of the fuel pile 18, and only to compensate for inefficient mixing of the fuel and primary air supplied to the furnace. The burnout of the flame 26 occurs in the combustion chamber or furnace zone 12 without regard to location with respect to the available heat transfer surfaces. The result is a high gas temperature, but not a luminous flame approaching the heat transfer surfaces. Convection heat transfer dominates over radiant heat transfer, hence more heat transfer surfaces must be provided than if radiant heat transfer increased. A horizontal fire tube boiler 28 (steam or hot water), with two convection passes, is located above furnace 12. Hot gases 30 heat fire tubes 32 and 34, pass through turnaround 36 and then through fire tubes 38 and 40, before exiting to the stack 42. Particulate material entrained in the hot gases drop out in area 44 and the ash is removed at 46. Door 48 on furnace 12 provides an opening for inspection and clean out.

Figure 2:
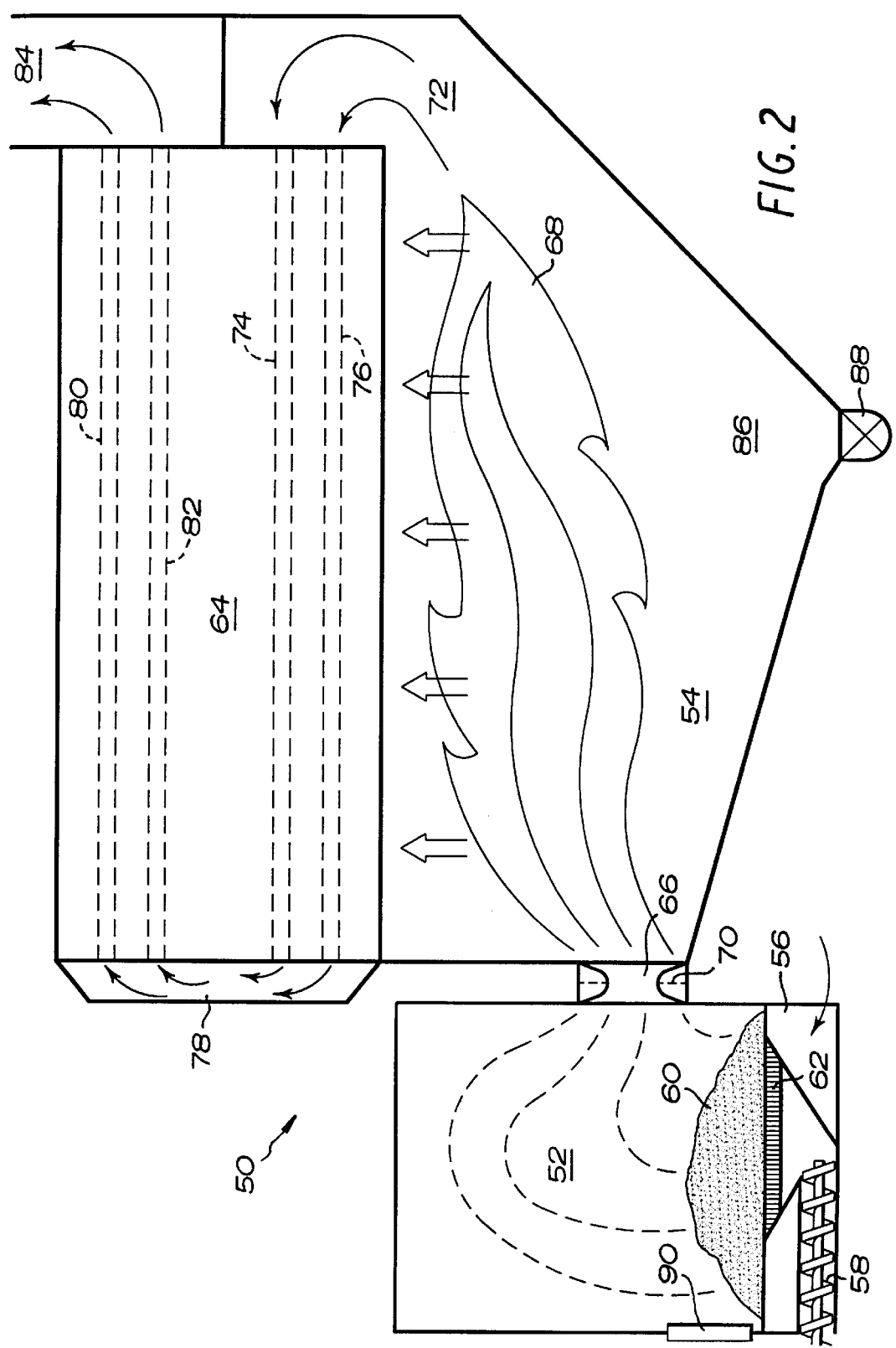
FIG. 2 is a side elevational view of a steam boiler of the type shown in FIG. 1 that has been retrofitted with the system of the present invention.

FIG. 2 depicts a system of the type shown in FIG. 1 retrofitted in accordance with the present invention, which is referred to generally by the numeral 50. System 50 includes two distinctly separate zones, namely, gasification chamber 52 and combustion chamber or furnace 54. Gasification chamber 52 includes a gasification air supply plenum 56 adjacent to, surrounding or under the chamber 52, an underfeed type fuel supply 58 for delivering fuel to fuel pile 60, and air distribution grate 62. Furnace 54 is located beneath the same type of horizontal fire-tube boiler 64 as depicted in FIG. 1.

In this new arrangement, the combustible gas produced in the gasifier 52 is not ignited until it reaches a strategic ignition point 66 with regard to the bottom of the heat transfer vessel (boiler shell). Once ignited the luminous flame 68 is shaped by tuyeres 70 and the flame is directed to an optimum stretched out position under the heat transfer surface of the boiler shell to allow a safe and efficient radiant heat transfer process to extract the optimum amount of heat before the hot gases enter the convection zone inside the fire-tubes. If the amount of convection heat transfer surface inside the fire-tubes is the same in both cases (FIGS. 1 and 2), the arrangement in FIG. 2 will transfer a larger total amount of heat to produce more useful energy from the same fuel energy input, hence at a higher fuel in to energy out efficiency. For new installations, a smaller convention zone would be required, reducing the total amount of metal required, hence reducing the cost of the system with the new arrangement. The cost of any additional gasifier volume is more than compensated for by the reduction in the size of the much more costly pressure vessel. Hot gases 72 enter fire tubes 74 and 76, pass through turnaround 78, and then pass through fire tubes 80 and 82, before exiting to the stack 84. Particulate material drops out in area 86 and the ash is removed at 88. Door 90 on chamber 52 provides an opening for inspection and clean out.

Figure 3:
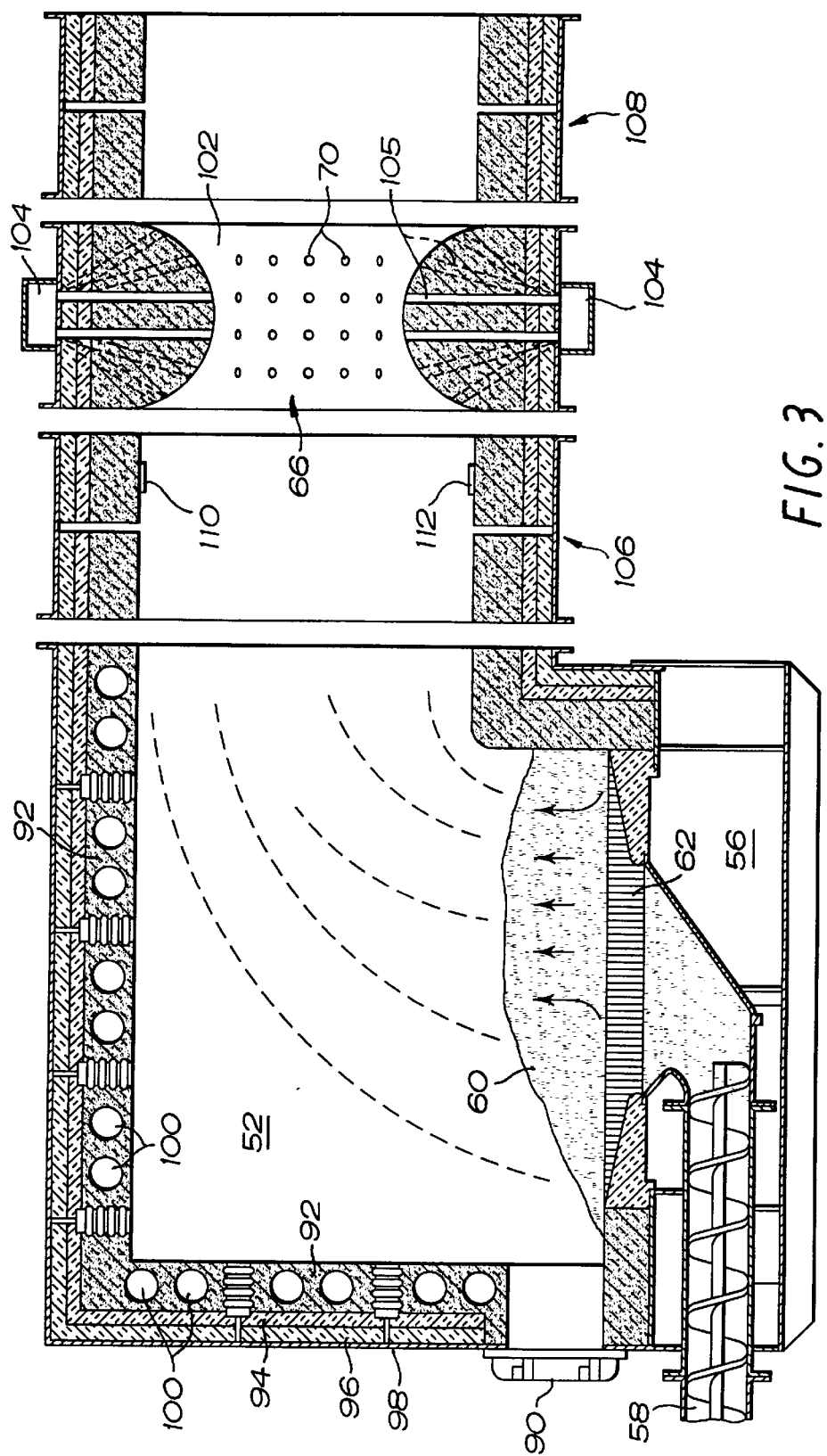
FIG. 3 is a detailed side elevational view of the system of the present invention shown in FIG. 2.

FIG. 3 is a detailed drawing of the gasification chamber 52 and the ignition zone 66 depicted in FIG. 2. The walls of gasification chamber 52 are lined with refractory brick 92 or other refractory material, such as 3000° F. plastic refractory. Adjacent to the refractory brick 92 is a high temperature insulation 94, such as 1900° F. block insulation, and adjacent to the outer casing 98 is low temperature insulation 96, such as 1000° F. mineral wool insulation. Although a shell and tube or other type air heat exchanger can be installed in the boiler exhaust gas path to preheat some or all of the air supplied for gasification and for the combustion air, the present approach uses a unique mechanism employing metal tubes 100 in the gasifier roof or walls to achieve the desired air heating when needed to maintain an appropriate gasification temperature, and to provide thermal protection of the refractory in the walls and roof. The air preheat is beneficial for maintaining sufficient velocity in the ignition zone 66 to keep the fuel and air well mixed. It is normally only used in the gasification zone for fuels with a moisture content (wet basis) of above 35% for drying the fuel. Air preheating also improves the overall thermal efficiency of the integrated system. For extremely dry fuels, the wall cooling can be modified to (no boiling) water heating using metal tubes to increase the rate of heat transfer and still achieve the thermal efficiency improvement.

The ignition point 66 is located within a combustion air injection device including ignition annulus 102 with a plurality of tuyeres or nozzles 70 which inject the combustion air at one or more specific angles, and in a specific pattern depending on the combustion chamber or furnace geometry. The injection tuyeres 70 are equipped with devices to cause the air to exit the tuyeres in a definite swirling pattern. The distance between the centerlines of the tuyeres is determined such that each swirling air mass pattern overlaps that of any adjacent tuyere.

Combustion air enters nozzles 70 through combustion air duct 104, which is connected to tuyeres 70 by means of conduits 105. The walls of annulus 102 are made of a high temperature refractory, such as the 3000° F. plastic refractory used in the gasification chamber 52. In order to adjust the location of the ignition point and to insure that the flame propagating from ignition point 66 effectively penetrates into the system, adapter units 106 and 108 may need to be attached to one or both sides of the ignition annulus 102. Temperature sensors 110 and 112 may be installed at the exit of the gasification chamber 52 in order to permit or inhibit a hot restart.

Figure 4:
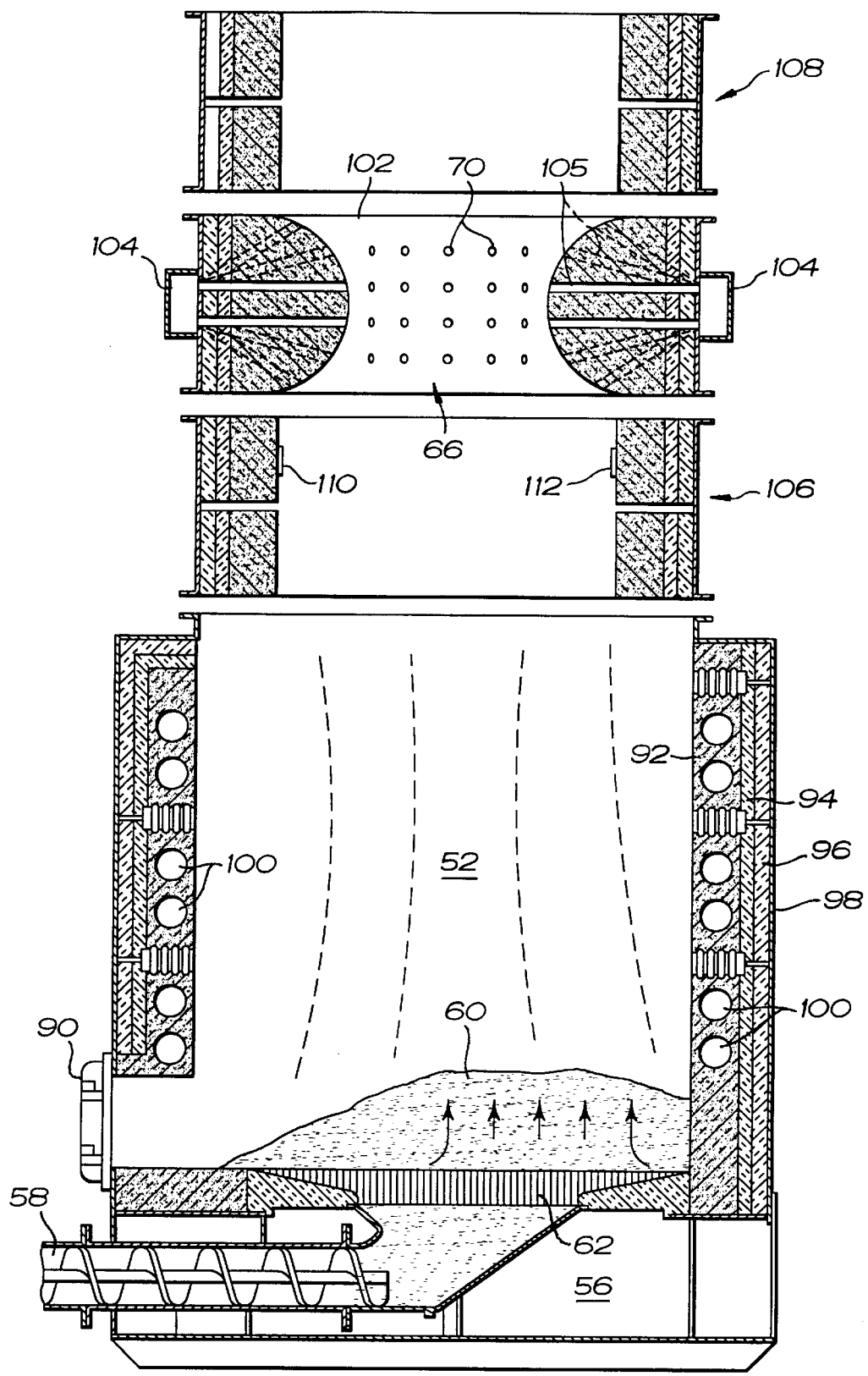
FIG. 4 is a detailed side elevational view of an alternative embodiment of the present invention.

FIG. 4 illustrates an alternative embodiment in which the air injection system and the adapter units are located above the gasification chamber 52 instead of the side of the chamber as shown in FIG. 3.

The process of starting up the units is identical in all cases. A cold start involves starting a small pile of solid biomass fuel burning on the gasification chamber floor in a fully oxidizing mode (all of the air necessary for complete combustion going through the gasification chamber). This mode of operation is continued until the refractory walls of the gasification chamber and of the furnace at the exit of the gasification chamber are well enough above the ignition temperature required to ignite the fuel gases produced, when sufficient oxygen is presented in the combustion air. Once the refractory temperature is high enough, the air supply to the gasification chamber is reduced, such that insufficient oxygen is present for complete combustion to occur. When the combustion air supply is opened, ignition of the gases from the gasification chamber takes place immediately at the point where the gases and the combustion air mix. The location of the ignition point will vary with the arrangement and needs of the type of hardware fired into, and can be varied by the use of adapter units.

The tuyeres or injection nozzles of the combustion air injection device cause the air to exit the tuyeres in a swirling pattern. Each swirling air mass pattern from a given tuyere overlaps that of any adjacent tuyere. Any hot combustible gases from the gasification chamber have no choice but to be mixed with an oxygen rich air stream in relatively close proximity to a specifically designed ignition point in the ignition zone made of high temperature refractory, which is maintained at a sufficient temperature to cause spontaneous ignition for the low calorific value fuel gas. A solid wall of flame (flame front) is then propagated at the proper angle, and with the proper shape and velocity, to safely and efficiently use the heat transfer surface of the heat transfer or heat exchange device with the optimum radiant heat transfer component. Depending on the volume and shape of the flame receiving hardware, the adapter units are used to guarantee the appropriate flame penetration into the hardware system.

The present invention can be used to fire scotch marine fire-tube boilers, fire box boilers, hybrid boilers, water-tube boilers of all types, including oil/gas designed packaged water-tube boilers, plus a wide variety of kilns. This is possible because the hot combustible gases and the combustion air can be directed to any location for ignition, and the flame shaped to match the physical arrangement of the particular furnace. It is also possible to fire thermal liquid heaters and various types of kilns with the system and process of present invention.

The flame developed at the outlet of the combustion air injection device is a highly luminous flame resembling a residual oil flame more than a natural gas flame. This is caused by the presence and combustion of vapor state tars found in biomass (heavy hydrocarbons) and some entrained fuel particles. The amount of solids observed to be entrained in the furnace zone, as evidenced by the number of sparklers (incandescent fuel/ash particles), is definitely reduced when the gasification chamber of the present invention is used compared to traditional combustion systems. Traditional systems that recycle flue gas as the gasification source of gasification oxygen are prone to high particulate carryover. Full scale test data on one unit retrofitted with the present invention showed particulate carryover emissions to be reduced by 53% after retrofit. This is believed to be the result of the reduced mass flow, hence reduced velocity, through the gasification chamber, plus increased residence time.

By making the gasification chamber out of refractory brick and/or other refractory materials, the safety of the system is assured. Hot restarts can be made in the gasification mode, and a temperature sensor installed in a particular point at the exit of the gasification chamber either permits or inhibits the hot restart. The automatic restart is permitted as long as the refractory temperature is hot enough to guarantee ignition of the expected combustible gases, and is inhibited at a temperature below the set point mandating that a manual cold start-up procedure be employed.

Automatic load (demand for steam, hot water, hot thermal fluid, or hot air) following is possible in accordance with the present invention by a combination of fuel and air modulation to the gasification chamber with corresponding combustion air corrections (within the limits of maintaining true gasification conditions in the gasification chamber), and also with a much simplified but proven on/off pressure or temperature differential setting for the working fluid, as long as the safe refractory ignition temperature sensor is included in the system.

The combustion system and process of the present invention advances the state of the art for the use of solid biomass fuels especially in the retrofit mode by careful optimization of the radiant heat transfer process in steam and hot water boiler applications up to about 85 million BTU energy output, plus those of thermal liquid heaters, and kilns. The system preferably includes a stand-alone gasification chamber to produce a fuel gas from many types of biomass fuels in a temperature and velocity controlled environment. Solid biomass fuel is preferably supplied to the gasification chamber using an under-feed, or other type, of fuel feeder with an updraft mode of operation. The system also includes a pathway for transmission of the hot fuel gas produced to a safety assured ignition point. The system provides a means for safe ignition of the fuel gas with combustion air, which can be preheated. The system further includes a device for shaping and directing the luminous flame towards a heat transfer surface or zone in order to optimize the overall heat transfer process with the appropriate ratio of radiant to convective heat transfer to achieve the maximum efficiency. The present invention provides complete burnout of the combustible components in the fuel gas within the volumetric limits of a furnace or combustion chamber or burnout zone. The present process and system also reduce emissions of carbon monoxide, nitrogen oxides, and particulates compared to conventional process of solid biomass fuel combustion. In addition, the present process and system provide for temperature control of the radiant flame through a predetermined rate of heat transfer such that the temperature of the flame/hot gases is within the acceptable design limits of the receiving heat transfer vessel. The present process and system are particularly applicable to retrofit of fire-tube and water-tube steam boilers, to retrofit of rotary kilns, and to retrofit of dry kilns used for such things as lumber drying.

The system and process of the present invention are also particularly advantageous because of their ability to produce, shape, and direct a luminous flame front closer to a significant amount of heat transfer surface than is possible with traditional process of burning solid biomass fuels. Therefore, the amount of heat transferred by radiation approaches the range of 40% to 60%, or about half of the total heat to be transferred, which is essentially the optimum condition for both overall thermal efficiency and capital cost effectiveness for the integrated system. When this condition occurs, the hot gas temperature at the entrance to the convection heat transfer section is lower at any given thermal output then that of traditional combustion systems. As a result, less thermal stressing occurs such that the metal failure rate will be substantially reduced (boiler tube cracking at the tube sheets, for example), and there is less potential for slag accumulations in the gasifier, the transmission zone, or on the heat transfer surfaces. Also, with the increased radiant heat transfer, less convection (and total) heat transfer surface is required for a given thermal output compared to the traditional approaches and hardware thereby providing a cost advantage. The present invention can be used effectively with solid biomass fuels such as wood chips, bark chips, hogged wood, planer shavings, saw dust, certain nut shells and husks, fruit pits, and other relatively low density biomass materials. In order to achieve the advantages and benefits of the present invention, a true gasification process must be employed in the manner described in this new approach. The use of preheated gasification air can allow high moisture content fuel to be successfully employed in the gasification zone without treatment, other than a screening out of very oversized particles, and tramp metal pieces. In the present system there is little potential for char/slag build-up anywhere in the gasification zone and associated hardware. No type of mechanical stirring device or fluidized-bed is needed in the gasification zone with the present invention, and there is no need for any moving parts for any purpose within the gasification zone.

In the practice of the present invention, certain design criteria must be considered, including the diameter (or side dimensions), height and grate open area dimension of the gasification chamber. The number, size, and spacing (horizontal and vertical) of the inlet air devices are part of the design of the air injection system for the gasification air. The number, size, spacing, and the outlet air swirl pattern of the combustion air injection tuyeres are an important design criteria for that system component. The dimensions of the annulus will also affect the shape and velocity of the flame front. The gasification and combustion air must also be controllable, and have shut-off valve capability. There must also be a predetermined refractory ignition point designed into the new configuration.

When arranged and operated in the mode described herein, the optimum conditions that exist allow the maximum radiant heat transfer within the safe boiling limits of the particular boiler vessel, or within safe heat transfer material temperature limits. This permits the maximum thermal efficiency to be achieved compared to the traditional process of burning solid biomass fuels either on a grate or in suspension. Overall, the present system is mechanically simpler, and the whole process easier to control with inherent safety features. The wide range in time-temperature control through the unique, close-coupling (dependent on flame penetration limits) of the gasification, gas ignition, completing of combustion, and heat transfer minimizes the formation of $NO_x$ from atmospherically introduced nitrogen while maximizing thermal efficiency. The unique air-fuel mixing and an appropriate residence time minimizes the emission of unburned CO from the combustion zone of the system, hence to the atmosphere. The low air-to-fuel ratio of the gasification chamber minimizes the particulate carryover with the combustible gases produced in the gasifier. The overall carbon burn out is also excellent because of the extended fuel residence time (in gasifier, plus in the transmission zone, and plus in the combustion zone) at a sufficiently high temperature, and because of the thoroughness of the unique mixing system. The system and process also allow the total excess air to be minimized because of the thorough mixing and extended residence time, and this also contributes to the higher efficiency achievable through their use.

What is claimed is:

1. A system for the production of fuel gas from solid biomass fuels and for the combustion of said fuel gas, comprising:

(a) a gasification zone for producing fuel gas from a solid biomass fuel, said gasification zone including a substantially horizontal air distribution grate for supporting a stationary bed of solid biomass fuel and being adapted for connection to a solid biomass fuel supply and to a gasification air supply;

(b) a predetermined ignition point;

(c) a pathway for conveying fuel gas from the gasification zone to the ignition point; and (d) a combustion air injection device for (1) mixing fuel gas and combustion air at the ignition point to initiate combustion of the fuel gas and the combustion gas, and (2) shaping and directing the flame produced, said combustion air injection device being adapted for connection to a combustion air supply and comprising a plurality of tuyeres which are disposed to cause the air to exit in a swirling pattern each with tuyere being disposed such that the swirling air pattern which exits from that tuyere overlaps the swirling air pattern from any adjacent tuyere.

2. The system of claim 1 wherein the gasification zone is a gasification chamber.

3. The system of claim 2 wherein the gasification chamber is a separate stand-alone unit.

4. The system of claim 1 further comprising a solid biomass fuel supply connected to the gasification zone.

5. The system of claim 1 further comprising a gasification air supply connected to the gasification zone.

6. The system of claim 5 wherein the gasification air supply is preheated.

7. The system of claim 1 further comprising a combustion air supply connected to the combustion air injection device.

8. The system of claim 7 wherein the combustion air supply is preheated.

9. The system of claim 1 wherein the tuyeres inject air at one or more predetermined angles.

10. The system of claim 1 wherein the combustion air injection device is in the shape of an annulus and wherein the tuyeres are disposed around the inner circumference of the annulus.

11. The system of claim 1 further comprising a heat transfer device, said heat transfer device comprising a combustion zone and a heat transfer area adjacent to the combustion zone, wherein said heat transfer device is connected to said combustion air injection device so that the flame produced is shaped and directed into the combustion zone toward the heat transfer area.

12. The system of claim 11 wherein the heat transfer device is a steam or hot water boiler.

13. The system of claim 11 wherein the heat transfer device is a thermal liquid heater.

14. The system of claim 11 wherein the heat transfer device is a kiln.

15. A process for the production of fuel gas from solid biomass fuels and for the combustion of said fuel gas, said process comprising:
   (a) gasifying the solid biomass fuel in a gasification zone to produce a fuel gas, said solid biomass fuel being continuously exposed to a supply of gasification air in said gasification zone;
   (b) conveying the fuel gas from the gasification zone to a predetermined ignition point;
   (c) mixing the fuel gas with combustion air at the ignition point;
   (d) igniting the mixture of fuel gas and combustion air to produce a flame; and
   (e) shaping and directing the flame produced by injecting the combustion air from a plurality of tuyeres which are disposed to cause the combustion air to exit in a swirling pattern such that the swirling air pattern which exits from each tuyere overlaps the swirling air pattern from any adjacent tuyere.

16. A process for improving the radiant heat transfer process in a heat transfer device, which has a combustion zone and a heat transfer area adjacent to the combustion zone and which uses a solid biomass fuel, said process comprising:
   (a) gasifying a stationary bed of said solid biomass fuel in a gasification zone to produce a fuel gas, said solid biomass fuel being continuously exposed to a supply of gasification air in said gasification zone;
   (b) conveying the fuel gas from the gasification zone to a predetermined ignition point;
   (c) mixing the fuel gas with combustion air at the ignition point;
   (d) igniting the mixture of fuel gas and combustion air to produce a flame; and
   (e) shaping and directing the flame produced into the combustion zone toward the heat transfer area by injecting the combustion air from a plurality of tuyeres which are disposed to cause the combustion air to exit in a swirling pattern such that the swirling air pattern which exits from each tuyere overlaps the swirling air pattern from any adjacent tuyere.

17. The process of claim 16 wherein the heat transfer device is a steam or hot water boiler.

18. The process of claim 16 wherein the heat transfer device is a thermal liquid heater.

19. A process for reducing the emissions of carbon monoxide, nitrogen oxides, sulfur oxides and particulates in a heat transfer device, which has a combustion zone and a heat transfer area adjacent to the combustion zone and which uses a solid biomass fuel, said process comprising:
   (a) gasifying the solid biomass fuel in a gasification zone to produce a hot fuel gas;
   (b) conveying the fuel gas from the gasification zone to a predetermined ignition point;
   (c) mixing the hot fuel gas with combustion air at the ignition point;
   (d) igniting the mixture of fuel gas and combustion air to produce a flame;
   (e) shaping and directing the flame produced into the combustion zone toward the heat transfer area by injecting the combustion air from a plurality of tuyeres which are disposed to cause the combustion air to exit in a swirling pattern such that the swirling air pattern which exits from each tuyere overlaps the swirling air pattern from any adjacent tuyere; and
   (f) supplying preheated ambient air to the gasification zone.

20. The process of claim 19 wherein the heat transfer device is a steam or hot water boiler.

21. The process of claim 19 wherein the heat transfer device is a thermal liquid heater.

22. The process of claim 19 wherein the heat transfer device is a kiln.

23. A process for retrofitting a heat transfer device, which has a combustion zone and a heat transfer area adjacent to the combustion zone and which uses a solid biomass fuel, said process comprising:
   (a) providing a gasification zone for producing fuel gas from solid biomass fuel, said gasification zone including a substantially horizontal air distribution grate for supporting a stationary bed of solid biomass fuel;
   (b) connecting a solid biomass fuel supply to the gasification zone;
   (c) connecting a gasification air supply to the gasification zone;
   (d) providing a pathway between the gasification zone and the combustion zone;
   (e) providing a predetermined ignition point in the pathway;
   (f) providing in the pathway a combustion air injection device comprising a plurality of tuyeres, for (1) mixing fuel gas and combustion air at the ignition point to initiate combustion of the fuel gas and the combustion air and, (2) shaping and directing the flame produced into the combustion zone toward the heat transfer area by arranging the tuyeres to cause the combustion air to exit the tuyeres in a swirling pattern such that the swirling air pattern which exits from each tuyere overlaps the swirling air pattern from any adjacent tuyere; and (g) connecting a combustion air supply to the combustion air injection device.

24. The process of claim 23 wherein the gasification zone is a gasification chamber.

25. The process of claim 24 wherein the gasification chamber is a separate stand-alone unit.

26. The process of claim 23 wherein the heat transfer device is a steam or hot water boiler.

27. The process of claim 23 wherein the heat transfer device is a thermal liquid heater.

28. The process of claim 23 wherein the heat transfer device is a kiln.

29. The process of claim 23 wherein the tuyeres inject air at one or more predetermined angles.

30. The process of claim 23 wherein the combustion air injection device is in the shape of an annulus and wherein the tuyeres are disposed around the inner circumference of the annulus.

* * * * *